Jan. 30, 1968     C. R. DEWEY     3,366,261
DISPENSER VALVE
Filed May 13, 1965     2 Sheets-Sheet 1
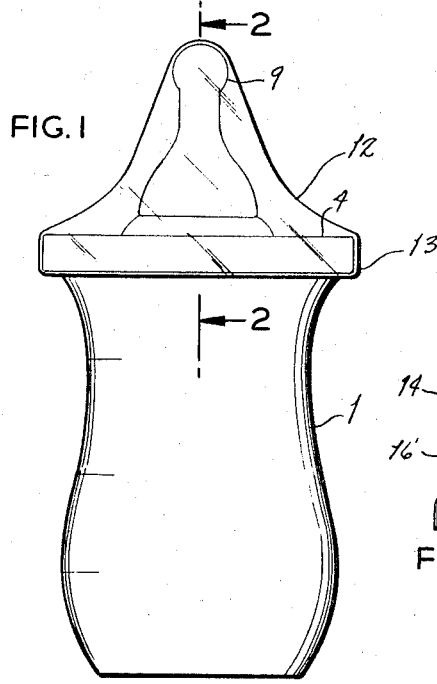
FIG. 1
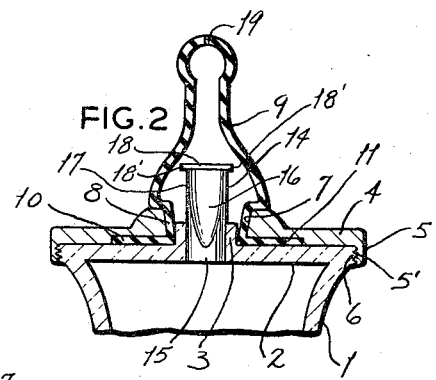
FIG. 2
FIG. 4
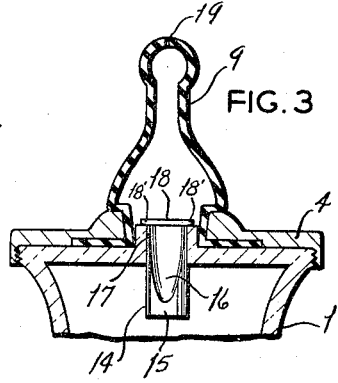
FIG. 3
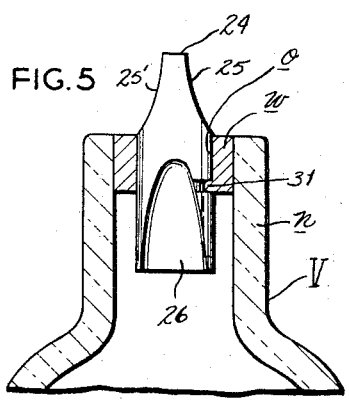
FIG. 5
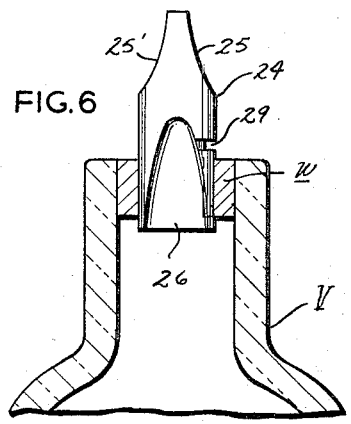
FIG. 6
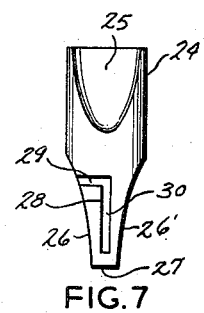
FIG. 7
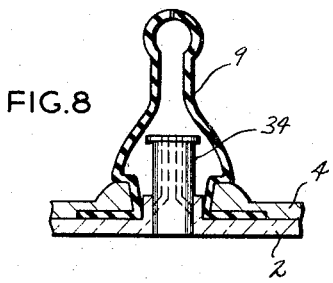
FIG. 8
INVENTOR
CAROLE R. DEWEY
BY
*Ralph N. Kalish*
ATTORNEY Jan. 30, 1968  C. R. DEWEY  3,366,261
DISPENSER VALVE
Filed May 13, 1965  2 Sheets-Sheet 2

INVENTOR
CAROLE R. DEWEY
BY Ralph N. Kalish
ATTORNEY

United States Patent Office 3,366,261
Patented Jan. 30, 1968

3,366,261
DISPENSER VALVE
Carole R. Dewey, Peoria, Ill., now by marriage Carole R. Abbott, Monticello, Ill. 61856
Filed May 13, 1965, Ser. No. 455,437
1 Claim. (Cl. 215—11)

This invention relates in general to valve constructions, and, more particularly, to a valve adapted for disposition within liquid dispensers.

It is an object of the present invention to provide a valve for liquid dispensers which is adapted, when in closed conditions, to serve as a closure or stopper for the dispenser, and when in operative position to effect discharge in a smooth flowing manner.

It is another object of the present invention to provide a valve of the type stated which is suitably adapted for utilization in bottles of various types having relatively narrow or constricted neck portion.

It is a further object of the present invention to provide a valve of the type stated which may be most economically manufactured; easily mounted within the particular dispensing unit; and which may be operated in a reliable and facile manner.

It is a still further object of the present invention to provide a valve for use with liquid dispensers which is adapted for manipulation so as to regulate the liquid flow.

It is another object of the present invention to provide a valve of the type stated which is particularly suitable for utilization with nursing bottles having a nipple mounted thereon for assuring snug closure prior to use to avoid undesirable, accidental, liquid leakage, thus eliminating contamination of the contents, and being especially adapted for facile manipulation into open position while permitting the individual to simultaneously attend the baby.

It is another object of the present invention to provide a valve of the type stated which, as placed in closed condition by the manufacturer, will cause the contents to remain in a sanitary, uncontaminated state, until the valve is opened by the user for content discharge.

It is a still further object of the present invention to provide a valve of the type stated which unitarily provides for both liquid and air passage.

Other objects and details of the invention will be apparent from the following description, when read in connection with the accompanying drawings (two sheets) wherein:

FIGURE 1 is a side view of a nursing bottle provided with nipple and sterilized covering therefor, said bottle incorporating a valve constructed in accordance with and embodying the present invention.

FIGURE 2 is a vertical transverse sectional view taken substantially on the line 2—2 of FIGURE 1, showing the valve in closed position.

FIGURE 3 is a vertical transverse sectional view taken substantially on the line 2—2 of FIGURE 1, but showing the valve in open condition.

FIGURE 4 is a side elevational view of the valve shown in FIGURES 2 and 3, but at an angle of 90° thereto.

FIGURE 5 is a fragmentary transverse vertical sectional view of the neck portion of a bottle having disposed therein another form of valve constructed in accordance with and embodying the present invention, with said valve being in closed condition.

FIGURE 6 is fragmentary transverse vertical sectional view of the neck portion of the bottle shown in FIGURE 5 and having the valve therein disposed shown in open condition.

FIGURE 7 is a side elevational view of the valve illustrated in FIGURES 5 and 6, but turned at an angle of 90° thereto.

FIGURE 8 is a fragmentary transverse vertical sectional view taken substantially on the line 2—2 of FIGURE 1, but showing a further form of valve constructed in accordance with and embodying the present invention, said valve being shown in closed condition.

Figure 9:
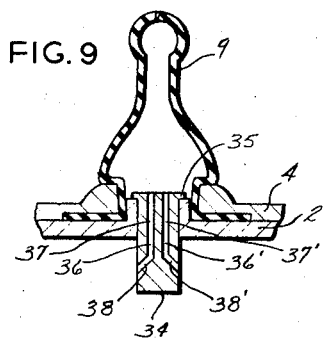
FIGURE 9 is a fragmentary vertical transverse sectional view taken substantially on the line 2—2 of FIGURE 1, but showing the valve illustrated in FIGURE 8 in open condition.

Referring now by reference characters to the drawings which illustrate the practical embodiments of the present invention, 1 designates a bottle as of glass, plastic, or the like, adapted primarily for nursing purposes, and having a flat top wall 2 centrally of which is a relatively short upstanding neck 3. Provided for demountable disposition upon top wall 2 of bottle 1 is a cap 4 having a depending skirt 5 internally threaded at 5' for interengagement with co-operating threads 6 formed on the confronting side wall portion of bottle top wall 2. Said cap 4 is provided with a central aperture 7 of increased cross section or diameter relative to the outside diameter of bottle neck 3 for accommodating same, as well as for receiving snugly therebetween the lower side wall portions 8 of a nipple 9. Said nipple 9 is provided with an outwardly projecting base flange 10, which is firmly received between the upper face of bottle top wall 2, and the under face of cap 4; said latter being slightly recessed as at 11 for accommodation purposes, whereby said nipple is maintained in stable operative relationship.

As shown in FIGURE 1, said bottle 1 may be provided with a protective, preferably transparent, flexible covering 12, such as any suitable, durable plastic material, for encasing nipple 9, and having a base skirt 13 of slightly less diameter than that of cap 4 so that the same may be slightly expanded for snug gripping of the cap skirt 5 for retention in protective position pending bottle usage.

By means of the protective cover 12, nipple 9 may be presterilized and maintained in such sanitary state until bottle 1, with the accompanying sterile feeding apparatus and bottle contents, is to be used.

Slideably disposed within bottle neck 3 is a valve 14 fabricated of any suitable material such as plastic, rubber, or the like, and being of a generally cylindrical form having a base portion 15, and with opposed side portions upwardly of base 15 being cut away to form inwardly and upwardly extending relative wide grooves 16, 16' which are in mutually converging relationship; terminating at the upper end of said valve 14 and being thereat spaced apart by a relatively narrow wall section indicated at 17. Integrally formed with, or otherwise provided upon, the upper end of said valve 14 is a relatively narrow elongated stop member 18 providing adequate surface for application of downwardly directed force for valve opening; which member projects at its ends beyond the adjacent side portions of valve 14, so as to form overhangs at each of its ends as at 18' for detaining disposition upon the upwardly directed surface of neck 3, for limiting the downward movement of valve 14 within neck 3 (see FIGURE 3). The width of stop member 18 is but slightly greater than the thickness of wall section 17, so that the same does not present any obstacle to liquid flow along either groove 16, 16'.

It will thus be seen that valve 14 is so dimensioned that when in closed position with base portion 15 received within neck 3, sufficient friction is developed so as to retain said valve in such position. In this condition, valve 14 acts as a stopper or closure so as to prevent liquid flow.

It is to be especially noted that valve 14 and the grooves 16, 16' thereon are of sufficient length relative to bottle neck 3 so that when said valve 14 is in open position, as shown in FIGURE 3, the said grooves 16, 16' will establish communication between the interior of bottle 1 and the interior of nipple 9. With valve 14 in open position, wherein stop member 18 will be supported upon the upper end of bottle neck 3, liquid will flow along one groove 16, from bottle 1 into the interior of nipple 9 for dispensing through the normal opening at the upper end thereof as shown at 19, while the other groove 16' will allow for air passage. Depending upon the relative disposition of valve 14 to the particular attitude of bottle 1 during use, one groove 16 will serve for a liquid flow, while the other groove 16' will provide for an air flow, with obviously the downwardly presented groove providing a path for liquid and the upper one for air.

By means of the unique character of bottle 1, valve 14 may be suitably manipulated through cover 12 so that the nipple 9 may not be contaminated by reason of operation of valve 14. In preparing bottle 1, valve 14 will be placed in initial position of closure as shown in FIGURE 2, and when the individual wishes to open bottle 1, the cover 12 together with nipple 9 provide sufficient flexibility so as to allow downward movement of valve 14 into open position. Subsequent to such movement, the sanitary cover 12 may then be removed and the bottle presented to the baby with full assurance that valve 14 is in proper operating position.

It will be seen that grooves 16, 16' will co-act with confronting portions of neck 3 to define a passage for fluid flow. Additionally of great importance is the fact that grooves 16, 16' have an upwardly and inwardly tapering character so that a regulation of the liquid flow may be effected. With valve 14 in full downward position as shown in FIGURE 3, the same is open to its widest extent since the distance between neck 3 and the confronting portion of grooves 16, 16' is at a maximum. However, by moving said valve 14 downwardly to a point above full downward position, the distance between said neck 3 and the confronting face of grooves 16, 16' will be obviously relatively reduced due to the tapering character of said grooves 16, 16' so that less than maximum flow may be achieved. Consequently, flow control is easily achieved by appropriate positioning of valve 14 within neck 3.

Referring now to FIGURES 5, 6, and 7, another form of bottle valve, indicated generally at 24, is shown for utilization within a generally standard type of bottle or vessel as indicated broadly at V, and having a neck n with an annular or washer-like member w fixedly maintained in its upper end, which member is provided with a central aperture as at o. Said valve 24 is of generally cylindrical form and being provided in its upper end portion with a pair of opposed converging recesses 25, 25' to form finger gripping surfaces for facile manipulation of said valve 24; the upper end portion of said valve 24 being presented in outwardly projecting relationship to the outer end of neck n.

In its lower portion, downwardly of surfaces 25, 25' and at an angle of 90° thereto, said valve 24 is provided with a pair of inwardly and downwardly tapering grooves 26, 26' being of maximum width at their lower ends, and being separated at such lower ends by a terminal wall portion 27. Further, valve 24 is of such diameter relative to the inside diameter of opening o of washer w as to be snugly received therein, although adapted for relative slideable movement therein under application of sufficient force due to the limited yieldability of washer w, which may be preferably formed of plastic or rubber. Intervening between the upper ends of grooves 26, 26' and the lower ends of gripping surfaces 25, 25', valve 24 is provided with a substantially central, unbroken zone for forming a fluid proof joint with washer w when positioned within opening o (FIGURE 5), whereby in such position said valve 24 will be closed.

In order to effect opening of valve 24, the user need merely grasp surfaces 25, 25' as by the thumb and first finger, and lift upwardly so as to break the joint between washer w and the intermediate zone of valve 24, and thereby establish communication between the interior of vessel V and the atmosphere along grooves 26, 26' (see FIGURE 6); it being recognized that said grooves 26, 26' are of a greater longitudinal extent than the thickness of washer w.

One of said grooves 26 will serve for liquid flow, such as 26, while 26' will permit of air passage. In order to close valve 24, the user need merely apply a downward force thereon to return same to the position shown in FIGURE 5.

In order to prevent undesired travel of valve 24 within washer w beyond either open or closed position, there is formed within said valve 24 in a side face portion between grooves 26, 26' a keyway 28, being of L-shaped form, having an upper transverse portion 29, being open at its outer end and at its inner end communicating with a vertical portion 30 which terminates spacedly upwardly of terminal wall portion 27. Presented for relative riding disposition within said keyway 28 is a projection or locking tab 31 integrally formed with washer w and projecting into opening o from the lower end portion thereof. Locking tab 31 is introduced into keyway 28 through the open end of transverse portion 29, and then said valve 24 is turned to move said tab 31 relatively therealong to the upper end of vertical portion 30, whereby when said valve 24 is in closed condition, locking tab 31 will be at the upper end of vertical portion 30, and when said valve 24 is in open position, said tab 31 will have been relatively moved to the lower end of said keyway 28. By means of the co-action of tab 31 and keyway 28, accidental disengagement of valve 24 from the associated vessel V is prevented. It will be recognized that the tapered character of grooves 26, 26' will co-act with the face of the opening o of washer w so as to allow for a regulation of the liquid flow in the same manner as with respect to grooves 16, 16' and neck 3 discussed above in conjunction with bottle 1. The angular disposition between grooves 26, 26' and gripping surfaces 25, 25' permit convenience of container dispensing obviating the necessity of turning the container.

Figure 10:
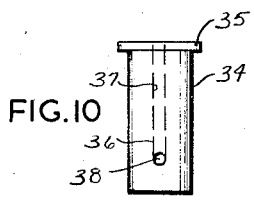
FIGURE 10 is a side elevational view of the valve shown in FIGURES 8 and 9, but being turned through an angle of 90° thereto.

Referring now to FIGURES 8, 9 and 10, another form of valve is indicated at 34 which may be provided as for usage with the bottle and nipple construction shown in FIGURES 1, 2, and 3, so that the portions of the latter shown in said figures for illustrating the operation of valve 34 will bear like reference numerals, as in the said FIGURES 1, 2, and 3. Valve 34 is of cylindrical form throughout its extent and being dimensioned for close tolerance within neck 3 so as to be productive of frictional engagement therewith in its various positions for providing limited resistance to movement. At its upper end, said valve 34 is provided with an external stop flange 35 for disposition upon the upper end surface of neck 3, when valve 34 is in open, or full inward, position as shown in FIGURE 9, so as to prevent any accidental displacement of valve 34 within the interior of bottle 1. Formed within valve 34 is a pair of passageways 36, 36', both of which open at their upper ends through the upper end surface of valve 34, and the major portions of which, as indicated at 37, 37', are in axial parallel relationship to the longitudinal axis of valve 34, and are of a length greater than the extent of neck 3. The lower ends of said major portions 37, 37' of passageways 36, 36', respectively, terminate spacedly from the very lower end of valve 34 and at their lower ends are continuous with relatively short portions 38, 38' which follow a downwardly and outwardly inclined path opening to the exterior through the side face of valve 34 at preferably diametrally opposed locations, and spacedly above the said lower end of valve 34.

The distance between the lower end of valve 34 and the lower ends of passageways 36, 36' is less than the extent of neck 3 so that when valve 34 is in upward position as shown in FIGURE 8, with the lower end of said valve 34 in substantial surface alignment with the under face of top wall 2 of bottle 1 the said lower ends of passageways 36, 36' are blocked by neck 3, thereby effecting closure of valve 34.

Downward movement of valve 34 within neck 3 in the same manner as discussed hereinabove with respect to valve 14 will affect valve opening by establishing communication between the interior of bottle 1 and nipple 9 through passageways 36, 36', since the lower ends of the portions 38, 38', respectively, thereof will be open. One of the passageways 36, 36', depending upon the attitude of bottle 1, will be presented for liquid flow, while the other, for air flow.

Figure 11:
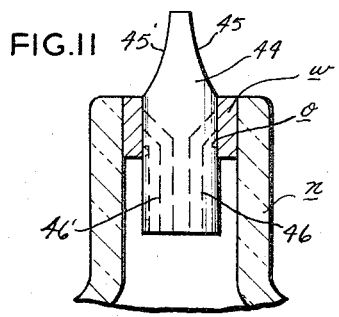
FIGURE 11 is a fragmentary transverse sectional view of a bottle neck having disposed therein a still further form of valve constructed in accordance with and embodying the present invention, said valve being shown in closed condition.
Figure 13:
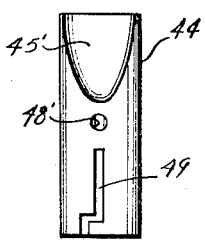
FIGURE 13 is a side elevational view of the valve shown in FIGURES 11 and 12, with the same being turned through an angle of 90° thereto.
Figure 12:
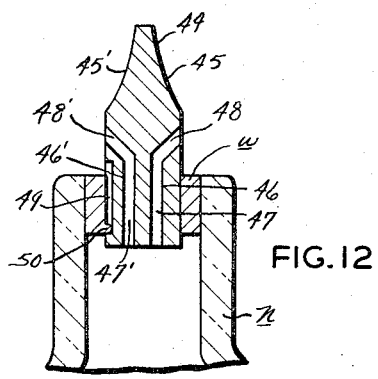
FIGURE 12 is a transverse vertical sectional view of a bottle neck having disposed therein the valve shown in FIGURE 11, but with the same being illustrated in open condition.

Referring now to FIGURES 11, 12 and 13, a further form of valve, as indicated at 44, may be, if desired, presented for use with a generally standard type bottle, such as that indicated broadly in FIGURES 5 and 6, having a neck n, annular member or washer w, with central opening o; said valve 44 at its upper portion being provided with finger gripping surfaces 45, 45', in all respects similar to surfaces 25, 25' of valve 24 hereinabove described. Downwardly of said gripping surfaces 45, 45', said valve 44 is of consistent cylindrical formation and is provided with a pair of passageways 46, 46' which are provided with primarily vertical portions 47, 47', which are axially parallel to the longitudinal axis of valve 44, opening at their lower ends at the base wall of said valve 44, and being continuous at their upper ends with upwardly and outwardly inclined portions 48, 48' which, at their upper ends, open through the side wall of valve 44 in downwardly spaced relationship to the proximate finger-gripping surfaces 45, 45'. As shown in FIGURE 11, when valve 44 is in downward or closed position, the upper ends of inclined portions 48, 48' of passageways 46, 46', respectively, will be directed toward the inner face of opening o of washer w and provide therewith a fluid tight joint. Upon upward movement of said valve 44 into the position shown in FIGURE 12, with sufficient elevation so as to present the upper open ends of portions 48, 48' upwardly of washer w, communication between the interior of the particular vessel and the atmosphere will be established. With valve 44 in open position, one of said passageways 46, 46' is available for liquid flow and the other for air flow, thereby assuring reliable, smooth operation.

In order to prevent unauthorized or accidental dislodgment of valve 44 from washer w, valve 44, in one of its side faces, is provided with an offset or staggered keyway 49 for receiving a locking tab 50 projecting from the wall of opening o of washer w; the co-action between said keyway 49 and co-operating tab 50 being substantially the same as with respect to the keyway 28 and locking tab 31, with respect to valve 24 hereinabove described.

Figure 14:
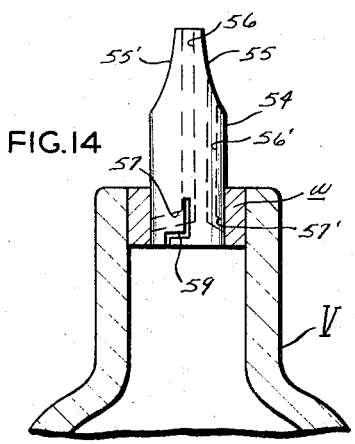
FIGURE 14 is a fragmentary transverse vertical sectional view of a bottle neck having disposed therein another form of valve constructed in accordance with and embodying the present invention, with said valve being shown in closed condition.

FIGURE 14 illustrates a still further form of valve indicated at 54, which may be provided for disposition within a bottle of the type indicated at V in FIGURE 5, and having a pair of finger-gripping surfaces 55, 55', similar in all respects to gripping surfaces 45, 45' of valve 44, hereinabove described. Said valve 54 being cylindrical, is dimensioned with respect to its associated washer w in the same manner as valves 24 and 44 hereinabove described. Said valve 54 is provided with a primarily liquid passageway 56, which is co-axial with body of valve 54 opening at its upper end through the upper end face of valve 54, and being continuous at a point spaced from the lower end face of valve 54 with a slightly downwardly and outwardly inclined portion 57, the outer end of which opens through the side face of valve 54 to form a liquid inlet and being located spacedly above the said lower end face of valve 54. There is also provided within valve 54 an air passageway 56', the major portion of which is axially parallel to liquid passageway 56, but being located laterally thereof and being of relatively reduced diameter or cross section; said air passageway 56' is continuous at its lower end with a downwardly and outwardly directed portion 57' which opens at its outer end through the side wall of valve 54, spacedly above the lower end face of said valve 54 and at a point substantially diametrally opposed to the outer end of portion 57 of liquid passageway 56. With valve 14 in elevated position, as shown in FIGURE 14, the same will be in closed condition, since the lower ends of passageways 56, 56' will be blocked by the confronting portions of the wall of the opening of the associated washer w. However, upon downward movement of said valve 54 a distance sufficient to cause the said lower ends of the portions 57, 57' of passageways 56, 56' to be brought into communication with the interior of the particular vessel, the said passageways 56, 56' will be open for liquid and air flow respectively. Said valve 54 may be similarly engaged to the related washer w so as to prevent undesired displacement, as by means of a keyway 59 and co-operating locking tab (not shown). Valve 54 is so designed as to provide for liquid flow co-axially of valve 54 as opposed to what might be considered lateral discharge as by valve 44.

Figure 15:
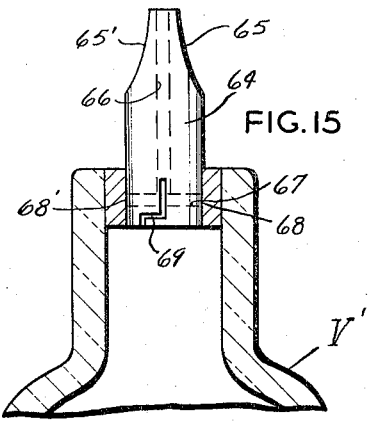
FIGURE 15 is a fragmentary transverse vertical sectional view of a bottle neck having mounted therein an additional form of valve constructed in accordance with and embodying the present invention.

FIGURE 15 illustrates an additional form of valve 64, which, if desired may be utilized for axial flow, but which is especially designed for utilization with a vessel as indicated at V', being formed of flexible material so as to constitute what is commonly referred to as a "squeeze" bottle, wherein the user by compressing the side walls of the vessel will cause displacement of the contents. Said valve 64 is provided at its upper end with finger-gripping surfaces 65, 65', which are in all respects similar to gripping surfaces 55, 55' of valve 54, and is also provided with a co-axial passageway 66 which, progresses from the upper end of said valve 64, through which said passageway 66 opens downwardly to a point spaced from the lower end of valve 64 for communication with a transverse passageway 67, extending diametrally of valve 64 and opening through opposed side wall portions thereof to provide ports 68, 68' which latter are spaced upwardly of the lower of said valve 64. Valve 64 may be intended for retention within its respective washer against accidental dislodgment as by means of a keyway 69, and co-operating locking tab (not shown) which are in all respects similar to the locking means hereinabove described in conjunction with valves 44, and 54.

With valve 64 in upward position as shown in FIGURE 15, ports 68, 68' are closed in tight joint formation with the confronting inner portions of the related washer. To effect flow, valve 64 is suitably depressed for movement inwardly of the vessel V' so as to present ports 68, 68' in communication with the interior of said vessel V'. Thereupon, compression or squeezing of the walls of vessel V' will simultaneously force the liquid content of vessel V' and entrained air through said ports 68, 68' for dispensing of the liquid through passageway 66.

It will be seen that valves constructed in accordance with the present invention are of relatively simple construction, being amenable to rapid high volume production as by molding through conventionally practiced techniques; which valves have a marked versatility being adapted for utilization with dispensing vessels of myriad types. Furthermore, the said valves are fully reliable in operation as when in closed condition, the same form a fluid-proof joint with the associated container portions and when in open condition, conduce to an even, continuous, smooth liquid flow, since appropriate provision is made for air replacement.

It should be understood that changes and modifications in the formation, construction, arrangements, and combination of the several parts of the Dispensing Valve may be made and substituted for these herein shown and described without departing from the nature and principle of my invention.

Having described my invention, what I desire to obtain by Letters Patent is:

1. In combination with a fluid container having a discharge opening, a resilient nipple disposed outwardly of, and in covering relationship to, said discharge opening so that contents of the container must flow through said nipple, a dispensing valve therefor comprising a valve body disposed within said container discharge opening for slideable movement axially thereof, said valve body having normally outer and inner ends, said body being provided with liquid and air passages, being disposed within said body on opposite sides of the longitudinal axis of said valve body, each of said liquid and air passages having a first portion axially parallel to the longitudinal axis of said valve body, and a second portion inclined with respect to the longitudinal axis of said valve body, each of said passages opening at one of its ends through the inner end of said valve body and communicating at its other end with the inner end of the related second portion, said second portion of each of said passages opening at its other or outer end through the side face of said valve body in spaced relationship to the outer end of said valve body, the outer ends of said second portions of said passages being substantially aligned transversely of the valve body, said body being provided at its normally outer end with a pair of complementary finger-gripping surfaces for facilitating manipulation of the valve body within said discharge opening, said surfaces being provided on opposite sides of the longitudinal axis of said valve body in opposed relationship and being inwardly and endwise inclined into converging relationship, said valve body having an offset keyway provided in one side face thereof, a locking tab provided within said discharge opening for reception within said keyway for preventing accidental displacement of said valve body from said container.

References Cited

UNITED STATES PATENTS

| | | | |
|---|---|---|---|
| 1,182,452 | 5/1916 | Bucklin | 222—514 X |
| 1,454,284 | 5/1923 | Holmes | 222—501 X |
| 1,471,868 | 10/1923 | Swartz | 222—522 X |
| 1,570,238 | 1/1926 | Gibson | 222—519 |
| 1,912,304 | 5/1933 | Phillips | 222—513 |
| 2,029,152 | 1/1936 | Bonkowski. | |
| 2,040,091 | 5/1936 | Koller | 222—519 X |
| 2,055,819 | 9/1936 | Georger | 222—519 |
| 2,547,744 | 4/1951 | Burger | 222—514 X |
| 2,607,345 | 7/1952 | Bachia et al. | 215—11 X |
| 2,780,398 | 2/1957 | Frey | 222—522 X |
| 2,790,582 | 4/1957 | Halpern | 222—522 X |
| 2,821,944 | 2/1958 | Blake | 222—514 X |
| 2,963,205 | 12/1960 | Beall | 222—514 X |
| 3,158,183 | 11/1964 | Brown et al. | 222—490 X |
| 3,166,107 | 1/1965 | Swenson et al. | 222—485 X |

WALTER SOBIN, *Primary Examiner.*